(12) United States Patent
Denifl et al.

(10) Patent No.: US 7,531,478 B2
(45) Date of Patent: *May 12, 2009

(54) PRODUCTION OF SUPPORTED OLEFIN POLYMERISATION CATALYSTS

(75) Inventors: Peter Denifl, Gries am Brenner (AT); Erik Van Praet, Västra Frolunda (SE); Michael Bartke, Järvenpää (FI)

(73) Assignee: Borealis Technology OY, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/499,761

(22) PCT Filed: Dec. 18, 2002

(86) PCT No.: PCT/EP02/14460

§ 371 (c)(1),
(2), (4) Date: Feb. 4, 2005

(87) PCT Pub. No.: WO03/051514

PCT Pub. Date: Jun. 26, 2003

(65) Prior Publication Data

US 2005/0119113 A1    Jun. 2, 2005

(30) Foreign Application Priority Data

Dec. 19, 2001  (EP) .................. 01660237

(51) Int. Cl.
*B01J 37/00* (2006.01)
*B01J 31/00* (2006.01)
*C08F 4/02* (2006.01)
*C08F 4/60* (2006.01)

(52) U.S. Cl. .............. 502/103; 502/104; 502/118

(58) Field of Classification Search .......... 502/104, 502/108, 128, 115, 103, 118; 526/124.2, 526/124.3
See application file for complete search history.

(56) References Cited

U.S. PATENT DOCUMENTS

| 3,412,104 | A | * | 11/1968 | McIntosh et al. ........... 524/313 |
| 4,517,307 | A | * | 5/1985 | Cuffiani et al. ............. 502/119 |
| 5,234,878 | A | | 8/1993 | Tsutsui et al. |
| 5,728,640 | A | | 3/1998 | Lu et al. |
| 7,238,637 | B2 | * | 7/2007 | Garoff et al. .............. 502/115 |
| 2001/0002389 | A1 | * | 5/2001 | Eaton et al. .............. 508/591 |

FOREIGN PATENT DOCUMENTS

| DE | 197 46 280 A1 | * | 4/1999 |
| DE | 19746280 A | | 4/1999 |
| EP | 0129368 A1 | | 12/1984 |
| EP | 0260130 A1 | | 3/1988 |
| EP | 0 295 312 A1 | * | 7/1988 |
| EP | 0279863 | | 8/1988 |
| EP | 0295312 A1 | | 12/1988 |
| EP | 0423101 A3 | | 4/1991 |
| EP | 0 442 725 A2 | | 8/1991 |
| EP | 0537130 A1 | | 4/1993 |
| EP | 0685494 A1 | | 12/1995 |
| EP | 0688794 A1 | | 12/1995 |
| FI | 86866 B | | 7/1992 |
| FI | 88047 B | | 12/1992 |
| FI | 88048 B | | 12/1992 |
| FI | 96615 B | | 12/1994 |
| WO | WO 94/28034 | | 12/1994 |
| WO | WO 95/12622 A1 | | 5/1995 |
| WO | WO 96/13529 A1 | | 5/1996 |
| WO | WO 97/02297 A1 | | 1/1997 |
| WO | WO 97/10248 A1 | | 3/1997 |
| WO | WO 97/17136 A1 | | 5/1997 |
| WO | WO 97/28170 A1 | | 8/1997 |
| WO | WO 98/46616 A1 | | 10/1998 |
| WO | WO 98/49208 A1 | | 11/1998 |
| WO | WO 98/56831 A1 | | 12/1998 |
| WO | WO 99/10353 A1 | | 3/1999 |
| WO | WO 99/12981 A1 | | 3/1999 |
| WO | WO 99/19335 A1 | | 4/1999 |
| WO | WO 99/41290 A1 | | 8/1999 |
| WO | WO 00/34341 A2 | | 6/2000 |
| WO | WO 01/70395 A2 | | 9/2001 |
| WO | WO 02/060963 A | | 8/2002 |

OTHER PUBLICATIONS

Cavazzini, M., et al., "Perfluorocarbon-soluble catalysts and reagents and the application of FBS (fluorous biphase system) to organic synthesis," *Journal of Fluorine Chemistry*, 1999, 94:183-193.

Davis, M.E., "Supported aqueous-phase catalysis," *Chemtech*, Aug. 1992, pp. 498-502.

Enders A. et al., *Chemie in unserer Zeit*, 34 Jahrg. 2000, No. 6.

Britovsek, George et al., "The Search for New-Generation Olefin Polymerization Catalysts: Life Beyond Metallocenes", *Angew. Chem. Int. Ed.*, 1999, 38:428-447.

International Search Report for PCT/EP02/14460, mailed Apr. 16, 2003.

Lo Nostro, P., "Phase Separation Properties of Fluorocarbons, Hydrocarbons and Their Copolymers", *Advances in Colloid and Interface Science*, 1995, 56:245-287.

Boor, Jr., John, "Ziegler-Natta Catalysts and Polymerizations", Academic Press, 1979, pp. 180-183.

* cited by examiner

*Primary Examiner*—Jerry Lorengo
*Assistant Examiner*—James E McDonough
(74) *Attorney, Agent, or Firm*—McDonnell Boehnen Hulbert & Berghoff LLP

(57) ABSTRACT

The invention provides a process for producing an olefin polymerisation catalyst, comprising suspending a porous particulate support material in a liquid/liquid two phase system, which comprises a solution of one or more catalyst components and an inert solvent immiscible therewith, to impregnate said solution into the pores of said support material, wherein the active transition metal concentration in the support is from 0.001 to 10% by weight of the dry catalyst system.

62 Claims, No Drawings

PRODUCTION OF SUPPORTED OLEFIN POLYMERISATION CATALYSTS

This invention relates to a process for the production of supported catalysts for olefin polymerisation, and their use in polymerising olefins.

BACKGROUND ART

Catalyst systems which are solutions of one or more catalyst components (e.g. a transition metal compound and optionally a cocatalyst) are known in the filed as homogeneous catalyst systems. Homogeneous systems are used as liquids in the polymerisation process. Such systems have in general a satisfactory catalytic activity, but their problem has been that the polymer thus produced has a poor morphology (e.g. the end polymer is in a form of a fluff having a low bulk density). As a consequence, operation of slurry and gas phase reactors using a homogeneous catalyst system cause problems in practice as i.a. fouling of the reactor can occur.

To overcome the problems of the homogeneous systems in a non-solution process the catalyst components have been supported, e.g. their solution impregnated, on porous organic or inorganic support material, e.g. silica. These supported systems, known as heterogeneous catalyst systems, can additionally be prepolymerised in order to further immobilise and stabilise the catalyst components.

However, also supported and optionally prepolymerised systems have problems. It is difficult to get an even distribution of the catalyst components in the porous carrier material; and leaching of the catalyst components from the support can occur. Such drawbacks lead to an unsatisfactory polymerisation behaviour of the catalyst, and as a result the morphology of the polymer product thus obtained is also poor. Furthermore, the uneven distribution of the catalyst components in the support material can have an adverse influence on the fragmentation behaviour of the support material during the polymerisation step.

The support can also have an adverse effect on the activity of the catalyst, on its polymerisation behaviour and on the properties of the end polymer.

Accordingly, prior art proposes a variety of different means for achieving an even distribution of the catalyst component(s) into the pores of a support material, and in particular various impregnation methods have been suggested: The support material can be slurried in the solution of the catalyst components, or said solution is added to the silica in a volume which is equal or less than the total pore volume of the used silica (see e.g. WO 95 12622 of Borealis). WO 97 17136 of Mobil oil discloses a method wherein Mg-treated silica is slurried to an aliphatic solvent, e.g. isopentane and a toluene solution of a metallocene and aluminoxane is added to the slurry. The catalyst components are allowed to impregnate in the formed mixture and finally the solvents of the mixture are removed by evaporation. EP 295 312 of Mitsui discloses a method wherein aluminoxane in a first solvent is precipitated by adding a second solvent wherein aluminoxane is insoluble, in the presence of a carrier to deposit the precipitated aluminoxane on the carrier.

WO 97 02297 of Exxon describes a variation of a conventional slurry prepolymerisation method wherein the amount of the solvent used for the supported catalyst particles during the prepolymerisation step is reduced to a volume equal or less than the total pore volume of the supported catalyst. According to said document said prepolymerisation conditions has to be adjusted to avoid any clumping problems due to the condensation of the solvent (which may lead to the migration of the catalyst components already encountered with the prior art slurry prepolymerisation method).

Due to the complexity of the catalyst systems, the need still exists to develop further catalyst systems and preparation methods thereof which overcome the problems of the prior art practice.

SUMMARY OF THE INVENTION

The present invention provides a further method for preparing a supported catalyst for polyolefin polymerisation.

Another object of the invention is to provide a solid catalyst with advantageous properties.

A further object is to provide a polymerisation process using the catalyst prepared according to the method of the invention, as well as a supported catalyst obtainable by the method of the invention.

DESCRIPTION OF THE INVENTION

The invention is based on the finding that an even distribution of the catalyst component(s) in a porous particulate support material can be achieved by impregnating a solution of one or more catalyst components into a porous support in a mixed liquid/liquid at least two phase system which comprises said solution of the catalyst component(s) and a solvent immiscible therewith.

Moreover, the inventors have also found that it is possible to further immobilise a solution of the catalyst component(s) impregnated into the pores of a porous particulate support material by suspending said impregnated support, containing said solution within the pores thereof, in a solvent immiscible with said solution and immobilising the catalyst component(s) of said solution within the pores of the dispersed support.

The features of the invention are defined in the claims.

Accordingly, the invention provides a process for producing a supported olefin polymerisation catalyst, comprising one or more active components which include a compound of a transition metal of Group 3 to 10 of the Periodic Table (IUPAC, Nomenclature of Inorganic Chemistry, 1989), comprising suspending particles of a porous support material in a mixture of a solution of said component or components with a solvent immiscible with said solution, and optionally recovering from the agitated mixture support particles impregnated by said solution.

As stated above the liquid/liquid at least two phase system of the invention can also be used for further immobilising a supported catalyst by dispersing (suspending) the porous support particles, which contain a solution of catalyst component(s) within the pores thereof, in a solvent immiscible with said solution and then solidifying the catalyst component(s) containing phase present in the pores of the dispersed support. The filling of the pores of the support material with said solution before carrying out the immobilisation step of the invention can be effected using the two phase impregnation step of the invention described above, whereby said solidification step can be carried out directly after the impregnation step, in the same "two phase" system, as a "one-pot" procedure. Alternatively, other suitable pore filling methods can also be used, e.g. those known from the prior art, whereafter, without removing said solution from the pores, the obtained impregnated particles can be suspended to a solvent immiscible with said solution and subjected to the solidification step of the invention.

Preferably, the support is impregnated according to the two phase system of the invention followed by, without any recovery of the impregnated particles from the immiscible solvent, the immobilisation step of the invention. I.e. said solution of the mixed liquid/liquid two phase system which contains the catalyst component(s) is sorbed into the pores of the support particles and then the sorbed phase is solidified within the pores of said particles surrounded by the immiscible solvent phase. Finally the particles of the immobilised supported catalyst are recovered, if desired.

Accordingly, in the method of the present invention, the solution of the catalyst component(s) forms the discontinuous phase which impregnates to the pores of the support and the solvent immiscible therewith forms the continuous phase surrounding the impregnated support particles.

The terms "immobilisation" and "solidification" are used herein interchangeably for the same purpose, i.e. for further "fixing" the catalyst component(s) to the support material and to achieve free-flowing solid catalyst particles. Said step can thus be effected in various ways: (i) by effecting a prepolymerisation reaction within said solution of catalyst component(s) impregnated to the pores of the support, (ii) by cross-linking, e.g. fully or partially cross-linking a catalyst component within the said impregnated solution by adding a cross-linking agent, (iii) by effecting a chemical reaction within impregnated solution whereby the reaction product precipitates ("solidifies"), and/or (iv) by causing an external stimulus to the emulsion system such as a temperature change to cause the solidification. Thus in said step the catalyst component(s) remain "fixed" within the pores of the support. It is also possible that one or more of the catalyst components may take part in the solidification/immobilisation reaction.

The supported catalyst obtained is in the form of compositionally uniform particles having a predetermined size range.

In a further embodiment of the invention said mixture is in a form of an emulsion, wherein the solution of the catalyst components constitutes the dispersed phase and the solvent the continuous phase.

Accordingly, the carrier particles may be suspended in said immiscible solvent before or after mixing of said solution therewith: alternatively they may be suspended in the solution and this added to the immiscible solvent. In a further effective impregnation procedure comprises: forming first a one phase liquid system of the solvent and the catalyst component(s) containing solution (e.g. by adjusting the temperature), then adding of the support particles and, finally, breaking of the one phase system to at least two liquid phases as by changing the temperature, whereby the dispersed phase impregnates to the pores of the carrier.

The invention is also industrially advantageous, since it enables the preparation of immobilised solid catalyst particles to be carried out as a one-pot procedure.

Dispersed Phase

The principles for preparing two phase systems are known in the chemical field. Thus, in order to form the two phase liquid system, the solution of the catalyst component(s) and the solvent used as the continuous liquid phase have to be essentially immiscible at least during the mixing step and, e.g. in case the carrier material is added after the catalyst solution and the immiscible solvent are combined, during the impregnation step of said solution into the pores of the support. This can be achieved in a known manner e.g. by choosing said two liquids and/or the temperature of the dispersing and impregnation and/or immobilisation step accordingly.

It has been found that when the two phase mixture or an emulsion of the invention is formed, the solution containing the catalyst component(s) will advantageously displace from the pores of the carrier any of the immiscible liquid which might have been sorbed. Any excess solution may be permitted to separate from the immiscible phase, and may easily be removed, as by decanting.

The impregnated and/or immobilised supported catalyst of the invention can be separated from the continuous phase, e.g. by filtration, and optionally washed with a suitable solvent and/or dried in a conventional manner.

A solvent may be employed to form the solution of the catalyst component(s). Said solvent is chosen so that it dissolves said catalyst component(s). The solvent can be preferably an organic solvent such as used in the field comprising an optionally substituted hydrocarbon, such as a linear or branched aliphatic, alicyclic or aromatic hydrocarbon, preferably a linear or cyclic alkane or alkene, an aromatic hydrocarbon and/or a halogen containing hydrocarbon. Examples of aromatic hydrocarbons are toluene, benzene, ethylbenzene, propylbenzene, butylbenzene and xylene. Toluene is a preferred solvent. The solution may comprise one or more solvents.

In another embodiment, it consists partly or completely of a liquid monomer, preferably an olefin monomer, designed to be polymerised in a "prepolymerisation" immobilisation step.

Continuous Phase

The solvent used to form the continuous liquid phase is chosen from a single solvent or a mixture of solvents and immiscible with the solution of the catalyst component(s) at least at the conditions (e.g. temperatures) used during the mixing/dispersing step and impregnation step, if the impregnation is effected after the mixing step of said two phase forming liquids.

Preferably said solvent is inert in relation to said compounds. The term "inert in relation to said compounds" means herein that the continuous phase is chemically inert, i.e. undergoes no chemical reaction with any catalyst forming component or catalyst precursor forming component. Thus, the catalyst compounds which are fixed to the pores of the carrier originate from the catalyst solution to be impregnated into the pores.

It is preferred that the catalyst component(s) used for forming the supported catalyst, as defined under "catalyst compounds" below, will not be soluble in the solvent of the continuous liquid phase. Preferably, said catalyst component(s) are essentially insoluble in said continuous phase forming solvent.

The term "liquid/liquid at least two phase system" used herein covers both bi- and multiphasic systems.

In cases where the solvent is removed from the catalyst solution (e.g. due to a temperature change) to cause the solidification of the active ingredients, said solidifying ingredients remain essentially in the pores of the carrier.

In a preferred embodiment of the invention said solvent forming the continuous phase is an inert solvent and includes halogenated organic solvents, particularly fluorinated organic solvents, preferably semi, highly or perfluorinated organic solvents and functionalised derivatives thereof, which means that said solvents may contain other functional groups and/or further halogens such as chlorine.

Examples of the above-mentioned solvents are semi, highly or perfluorinated (a) hydrocarbons, such as alkanes, alkenes and cycloalkanes, (b) ethers, e.g. perfluorinated ethers and (c) amines, particularly tertiary amines, and functionalised derivatives thereof. Preferred are perfluorohydrocarbons of e.g. C3-C30, such as C4-C10. Specific examples of suitable perfluoroalkanes and -cycloalkanes include perfluorohexane, -heptane,-octane and-(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. In this respect, it is referred to the articles of A. Enders and G. Maas in "Chemie in unserer Zeit", 34. Jahrg. 2000, Nr.6, and of Pierandrea Lo Nostro in "Advances in Colloid and Interface Science, 56 (1995) 245-287, Elsevier Science.

The fluorinated solvents are particularly preferred as they are apolar, hydrophobic and have very limited miscibility with common organic solvents in certain temperature ranges.

Furthermore, these fluorinated solvents are chemically very inert and are very poor solvents for polar compounds such as catalytically active compounds and precursors or reaction products thereof. This finding of the inventors is very important in the formation of catalyst particles, because the reactive compounds can be kept within the catalyst solution in the pores of the support material so that no relevant reactions in the continuous phase which would worsen e.g. the morphology of the solidified catalyst particles can be observed.

Support Material

The support (carrier) material can be any porous particulate material usable as a support, e.g. any support material conventionally used in the field, such as an inorganic or organic material, e.g. an organic or inorganic polymeric material. Preferably, the support is a metal or metalloid oxide such as silica or alumina, or a mixture thereof. Particularly, silica can be used.

The support material may be treated before subjecting to the two phase system. The treatment can be used for modifying the properties of the support, e.g. the acidity, for removing any water and/or e.g. in case of silica for reducing the hydroxy functionalities on the support. Alternatively, the support material can be treated to introduce any desired functionalities on the support material. A further possibility is to pretreat the support material with a cocatalyst(s) before subjecting to the method of the invention. The mentioned treatments are within the knowledge of a person skilled in the art and include e.g. a heat (calcination) and a chemical treatment.

The particle size and porosity of support material can be chosen depending e.g. on the desired polymerisation behaviour of the catalyst. E.g. an average particle size range may vary between 1 to 500 μm, e.g. 5 to 500 μm, advantageously 5 to 200 μm, e.g. 10 to 100 μm, such as 20 to 50 μm, and a pore volume between 0.1 to 4 ml/g. Commercially available support materials with varying composition, particle size, pore size, total pore volume, surface area etc. (e.g. Davison 948 available from Davision Chemical Company, Baltimore, Md., US, or Sylopol 55, available from Grace) are usable in this invention.

The quantity of carrier employed varies according to its porosity, and according to the volume of solution employed.

Dispersing Step

The dispersion/suspension can be formed by any means known in the art: by mixing, such as by stirring said solution (vigorously) to said solvent forming the continuous phase or by means of mixing mills, or by means of ultra sonic wave. The mixing may be effected at lower or elevated temperatures, e.g. between 0 and 100° C., depending i.a. on the used solvents, and is chosen accordingly.

A further possibility is, as stated above, to use a so called "one phase" change method for preparing the two phase system by first forming a homogeneous system which is then changed by changing the temperature of the system to a biphasic system. Preferably, the support material is added to the one phase system before the change to the biphasic system. If needed, part of the catalyst forming compounds may be added after the biphasic system is formed.

The formation of a two phase system via said "one phase" change may be one preferable method, especially when e.g. fluorinated solvents are used as the continuous phase, since the miscibility of the fluorinated solvents, in particular perfluorinated solvents, with common organic solvents (e.g. alkane, such as pentane, hexane, chloroform, toluene) is dependent on the temperature so that a one phase system (homogeneous phase) of the fluorous solvent and a common organic solvent can be formed above a certain critical temperature.

The impregnation of the catalyst solution may be effected before or after the dispersion of the support material to said immiscible solvent as the continuous phase.

The dispersion step and the solidification step are preferably effected, as for example, under appropriate stirring.

The ratio of the first (e.g. fluorous solvent) and second solvent (common organic solvent as defined above for the "Continuous Phase") is chosen so that the first solution forms the discontinuous phase in the at least two phase system. The volume ratio of solution of the catalyst component(s) to the immiscible liquid forming the continuous phase is not narrowly critical. Suitably, said solution is used in a volume which is less or equal to the total pore volume of the support material, and preferably corresponds essentially to the total pore volume of the support material. Any excess of said solution remained after the impregnation step may be allowed to separate from the immiscible continuous phase and/or support material and can be removed before the optional immobilisation of step of the supported particles. Alternatively, the entire catalyst solution can be brought to the immiscible solvent (continuous phase) within the pores of the support.

In a preferred operation the process is so conducted that the volume of solution employed is entirely sorbed by the carrier particles, thus rendering unnecessary any post-impregnation separation of excess solution or carrier.

The continuous phase is preferably used in an amount which enables the suspending (and surrounding) the particles.

In the preparation process of the invention the solution to be impregnated to the pores of the carrier may already contain all the compounds (to be added) before the impregnation step thereof. Alternatively, e.g. depending on the reactivity of the compounds, at least two separate catalyst solutions for each or part of the catalyst forming compounds may be prepared, which are then impregnated successively into the pores.

Additional agents and/or components can be added to the system in any stage of the impregnation and/or solidification step, if needed.

Catalyst Compounds

The term "catalyst component" as used herein includes, in addition to said transition metal compound, also any additional cocatalyst(s). (e.g. additional transition metal compounds and/or activators and/or poison scavengers) and/or any reaction product(s) of a transition compound(s) and a cocatalyst(s). Thus the catalyst may be formed in situ from the catalyst components in said solution in a manner known in the art.

It should also be understood that the catalyst prepared according to the invention may be used as such in the polymerisation process or may represent a "catalyst precursor" which is further activated or treated to form the active catalyst system. Furthermore, said catalyst of the invention may be part of a further catalyst system. These alternatives are within the knowledge of a skilled person.

The term "transition metal compound" can be any transition metal compound which exhibits the catalytic activity alone or together with a cocatalyst/activator. The transition metal compounds are well known in the art and cover e.g. compounds of metals from Group 3 to 10, e.g. 3 to 7, such as Group 4 to 6, (IUPAC), as well as lanthanides or actinides.

A preferable subgroup of the transition metal compounds are organometallic compounds of a transition metal which, as used herein, includes any metallocene or non-metallocene compound of a transition metal which bears at least one organic (co-ordination) ligand and exhibits the catalytic activity alone or together with a cocatalyst.

Accordingly, said organotransition metal compound may have the following formula I:

$$(L)_m R_n MX_q \quad (I)$$

wherein M is a transition metal as defined above and each X is independently a monovalent anionic ligand, such as a σ-ligand, each L is independently an organic ligand which coordinates to M, R is a bridging group linking two ligands L, m is 1, 2 or 3, n is 0, 1 or 2, preferably 0 or 1, q is 1, 2 or 3, and m+q is equal to the valency of the metal.

In a more preferred definition, each L is independently (a) a substituted or unsubstituted cyclopentadiene or a mono-, bi- or multifused derivative of a cyclopentadiene which optionally bear further substituents and/or one or more hetero ring atoms from a Group 13 to 16 of the Periodic Table (IUPAC); or (b) an acyclic, $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or (c) a cyclic σ-, $\eta^1$- to $\eta^4$- or $\eta^6$-mono-, bi- or multidentate ligand composed of unsubstituted or substituted mono-, bi- or multicyclic ring systems selected from aromatic or non-aromatic or partially saturated ring systems, and containing carbon ring atoms and optionally one or more heteroatoms selected from Groups 15 and 16 of the Periodic Table.

By "σ-ligand" is meant a group bonded to the metal at one or more places via a sigma bond.

According to a preferred embodiment said organotransition metal compound I is a group of compounds known as metallocenes. Said metallocenes bear at least one organic ligand, generally 1, 2 or 3, e.g. 1 or 2, which is q-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have a formula II:

$$(Cp)_m R_n MX_q \quad (II)$$

wherein:
each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$ or —NR"$_2$, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom wherein they are attached to;

R is a bridge of 1-7 atoms, e.g. a bridge of 1-4 C-atoms and 0-4 heteroatoms, wherein the heteroatom(s) can be e.g. Si, Ge and/or O atom(s), whereby each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR$^1_2$—, wherein each R$^1$ is independently C1-C20-alkyl, C6-C20-aryl or tri(C1-C20-alkyl)silyl-residue, such as trimethylsilyl-;

M is a transition metal of Group 4 to 6, such as Group 4, e.g. Ti, Zr or Hf, each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$ or —NR"$_2$; each R" is independently hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom wherein they are attached to;

and each of the above mentioned ring moiety alone or as a part of a moiety as the substituent for Cp, X, R" or R$^1$ can further be substituted e.g. with C1-C20-alkyl which may contain Si and/or O atoms;

n is 0, 1 or 2, preferably 0 or 1, m is 1, 2 or 3, e.g. 1 or 2, q is 1, 2 or 3, e.g. 2 or 3, wherein m+q is equal to the valency of M.

Said metallocenes II and their preparation are well known in the art.

Cp is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated.

In a suitable subgroup of the compounds of formula II each Cp independently bears one or more substituents selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20 alkyl; X is as H, halogen, C1-C20-alkyl, C1-C20-alkoxy, C6-C20-aryl, C7-C20-arylalkenyl or —NR"$_2$ as defined above, e.g. —N(C1-C20alkyl)$_2$; R is a methylene, ethylene or a silyl bridge, whereby the silyl can be substituted as defined above, e.g. a dimethylsilyl=, methylphenylsilyl=or trimethylsilylmethylsilyl=bridge; n is 0 or 1; m is 2 and q is two.

Preferably, R" is other than hydrogen.

A specific subgroup includes the well known metallocenes of Zr, Hf and Ti with one or two, e.g. two, $\eta^5$-ligands which may be bridged or unbridged cyclopentadienyl ligands optionally substituted with eg. siloxy, alkyl and/or aryl as defined above, or with two unbridged or bridged indenyl ligands optionally substituted in any of the ring moieties with eg. siloxy, alkyl and/or aryl as defined above, e.g. at 2-, 3-, 4- and/or 7-positions. As specific examples e.g. bis(alkylcyclopentadienyl)Zr (or Ti or Hf) dihalogenides can be mentioned, such as bis(n-butylcyclopentadienyl)ZrCl2 and bis(n-butyl-cyclopentadienyl)HfCl2, see e.g. EP-A-129 368. Examples of compounds wherein the metal atom bears a —NR''$_2$ ligand are disclosed i.a. in WO-A-9856831 and WO-A-0034341. The contents of the above documents are incorporated herein by reference. Further metallocenes are described e.g. in EP-A-260 130. As further examples of usable metallocenes may also be found e.g. from WO-A-9728170, WO-A-9846616, WO-A-9849208, WO-A-9912981, WO-A-9919335, WO-A-9856831, WO-A-0034341, EP-A-423 101 and EP-A-537 130 as well as V. C. Gibson et al., in Angew. Chem. Int. Ed., engl., vol 38, 1999, pp 428-447, the disclosures of which are incorporated herein by reference.

Alternatively, in a further subgroup of the metallocene compounds, the metal bears a Cp group as defined above and additionally a $\eta^1$ or $\eta^2$ ligand, wherein said ligands may or may not be bridged to each other. This subgroup includes so called "scorpionate compounds" (with constrained geometry) in which the metal is complexed by a $\eta^5$ ligand bridged to a $\eta^1$ or $\eta^2$ ligand, preferably $\eta^1$ (for example a σ-bonded) ligand, e.g. a metal complex of a Cp group as defined above, e.g. a cyclopentadienyl group, which bears, via a bridge member, an acyclic or cyclic group containing at least one heteroatom, e.g. —NR$_{12}$ as defined above. Such compounds are described e.g. in WO-A-9613529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl.

Another subgroup of the organotransition metal compounds of formula I usable in the present invention is known as non-metallocenes wherein the transition metal (preferably a Group 4 to 6 transition metal, suitably Ti, Zr or Hf) has a co-ordination ligand other than cyclopentadienyl ligand.

The term "non-metallocene" herein means compounds, which bear no cyclopentadienyl ligands or fused derivatives thereof, but one or more non-cyclopentadienyl η-or σ-, mono-, bi- or multidentate ligand. Such ligands can be chosen e.g. from (a) acyclic, $\eta^1$- to $\eta^4$ or $\eta^6$-ligands composed of atoms from Groups 13 to 16 of the Periodic Table (IUPAC), e.g. an acyclic pentadienyl ligand wherein the chain consists of carbon atoms and optionally one or more heteroatoms from Groups 13 to 16 (IUPAC), and in which the open chain ligand may be fused with one or two, preferably two, aromatic or non-aromatic rings and/or bear further substituents (see e.g. WO 01 70395, WO 97 10248 and WO 99 41290), or (b) cyclic σ-, $\eta^1$- to $\eta^4$- or $\eta^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from Groups 15 and 16 of the Periodic Table (IUPAC) (see e.g. WO 99 10353). Bi- or multidentate ring systems include also bridged ring systems wherein each ring is linked via a bridging group, e.g. via an atom from Groups 15 or 16 of the Periodic Table, e.g. N, O or S, to the transition metal atom (see e.g. WO 02 060963). As examples of such compounds, i.a. transition metal complexes with nitrogen-based, cyclic or acyclic aliphatic or aromatic ligands, e.g. such as those described in the applicant's earlier application WO-A-9910353 or in the Review of V. C. Gibson at al., in Angew. Chem. Int. Ed., engl., vol 38, 1999, pp 428-447 or with oxygen-based ligands, such as Group 4 metal complexes bearing bidentate cyclic or acyclic aliphatic or aromatic alkoxide ligands, e.g. optionally substituted, bridged bisphenylic ligands (see i.a. the above review of Gibson et al.). Further specific examples of non-$\eta^5$ ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference. It should be noted that the diversity does not affect the applicability of the process of the invention, whose essential particle-shaping measures remain unaffected by the particular content of the particles to be shaped.

The preparation of metallocenes and non-metallocenes, and the organic ligands thereof, usable in the invention is well documented in the prior art, and reference is made e.g. to the above cited documents. Some of said compounds are also commercially available. Thus, said transition metal compounds can be prepared according to or analogously to the methods described in the literature, e.g. by first preparing the organic ligand moiety and then metallating said organic ligand (η-ligand) with a transition metal. Alternatively, a metal ion of an existing metallocene can be exchanged for another metal ion through transmetallation.

A further suitable subgroup of transition metal compounds include the well known Ziegler-Natta catalysts comprising a transition metal compound of Group 4 to 6 of the Periodic Table (IUPAC) and a compound of Group 1 to 3 of the Periodic Table (IUPAC), and additionally other additives, such as a donor. The catalyst prepared by the invention may preferably form a Ziegler-Natta catalyst component comprising a titanium compound, a magnesium compound and optionally an internal donor compound. Said Ziegler-Natta component can be used as such or, preferably, together with a cocatalyst and/or an external donor. Alternatively, a cocatalyst and/or an external donor may be incorporated to said Ziegler-Natta component when preparing the catalyst according to the method of the invention. The compounds, compositions and the preparation methods are well documented in the prior art literature, i.a. textbooks and patent literature, for the compounds and systems e.g. EP-A-688 794 and the Finnish patent documents nos. 86866, 96615, 88047 and 88048 can be mentioned, the contents of each above document are incorporated herein by reference.

The transition metal compounds include also a group of catalyst systems containing chromium or nickel.

If several different transition metal compounds are used (mixed dual or multicatalyst systems), these can be any combinations of the above transition metal compounds or of the above transition metal compounds with other catalyst compounds (including Ziegler-Natta and chromium oxide systems), e.g. a combination at least of two or more a metallocenes, of a metallocene and a non-metallocene, as well as of a metallocene and/or a non-metallocene with a Ziegler-Natta catalyst system (which comprises a transition metal compound and a compound of a metal from Group 2 of the Periodic Table, such as a Mg compound).

In all cases it is necessary to ensure that the total quantity of dissolved catalytic material introduced in to the process will, when impregnated on the carrier particles, provide an active transition metal concentration in the support of 0.001 to 10%, e.g. 0.01 to 4%, preferably 0.01 to 1%, such as 0.05 to 0.8 or 0.1 to 0.5% by weight of the dry catalyst system in case of metallocenes and non-metallocenes as defined above. In case of a Ziegler-Natta catalyst an active transition metal concentration in the support can be in the range of 0.01 to 10%, e.g. 0.1 to 4%, especially 0.5 to 3.0%, such as 1.0 to 3.0% or 1.0 to 2.0% by weight of the dry catalyst system.

As stated above the catalyst prepared according to the present invention may further comprise one or more cocatalysts well known in the art, preferably an activator containing aluminium or boron. Examples of such activators are organo aluminium compounds, such as trialkylaluminium compound and/or aluminoxane compound, or non-coordination ionic cocatalysts, such as boron activators.

Preferred as cocatalysts for metallocenes and non-metallocenes as defined above, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. In this regard mention may be made particularly to boron compounds known in the art. Said activators are commercially available or can be prepared according to the prior art literature.

Further aluminoxane cocatalysts are described i.a. in WO 94/28034 which is incorporated herein by reference. These are linear or cyclic oligomers of having up to 40, preferably 3 to 20, —(Al(R''')O)— repeat units (wherein R''' is hydrogen, C1-C10-alkyl (preferably methyl) or C6-C18-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of aluminoxanes, such as methylaluminumoxane (MAO), the amount of Al, provided by aluminoxane, can be chosen to provide an Al:transition metal molar ratio e.g. in the range of 1:1 to 10 000:1, suitably 5:1 to 8000:1, preferably 10:1 to 7000:1, e.g. 100:1 to 4000:1, such as 100:1 to 1500:1.

The quantity of cocatalyst to be employed in the catalyst of the invention is thus variable, and depends on the conditions and the particular transition metal compound chosen in a manner well known to a person skilled in the art.

Any additional components to be contained in the solution comprising the transition metal compound may be added to said solution before or, alternatively, after the mixing/dispersing step and/or impregnation step.

Solidification Step

As stated above, particularly, before the recovery of the impregnation method of the invention, said solution impregnated in said support particles may be subjected to solidification.

This may be effected by polymerisation of a monomer, preferably an olefinic monomer, present in the solution in the pores of the impregnated support, this according to one embodiment being an alkane employed as solvent to form said solution.

In a further embodiment of the invention prepolymerisation is effected by adding a monomer, in liquid or, preferably, in gaseous state to the impregnated support suspension in said continuous solvent immiscible with the impregnated solution. A catalytically active transition metal component or any other catalytically active compound, such as a peroxide, present in the solution within said pores of the support causes the monomers to polymerise in said solution. The formed polymer matrix in turn causes the content of the pores to solidify. It is also possible to use a combination of the liquid and gaseous monomer(s) which may contain the same or different monomer.

Naturally the degree of the prepolymerisation can vary substantially. The amount of monomer used may correspond e.g. to 1 to 500%, preferably 1 to 300%, such as 5 to 200%, e.g. 10 to 100% or 30 to 80% wt of the initial catalyst.

The monomer used for prepolymerising the droplets of the at least two phase system can be any conventional gaseous or liquid monomer. When the solvent used to form the solution of the catalyst component(s) is not the solidifying monomer, a gaseous monomer is preferably used. As examples, olefin monomers each having 2 to 20 carbon atoms can be used. The olefin can be linear or branched, cyclic or acyclic, aromatic or aliphatic, including ethylene, propylene, 1-butene, 1-pentene, 2-methyl-1-butene, 3-methyl-1-butene, 1-hexene, 2-methyl-1-pentene, 3-methyl-1-pentene, 4-methyl-1-pentene, 2-ethyl-1-butene, 2,3-dimethyl-1-butene, 1-octene, styrene, vinylcyclohexane etc.

The monomer used for the prepolymerisation can be the same or different, preferably the same, to that used for the actual polymerisation step; also a comonomer can be used in the prepolymerisation step. The prepolymerisation conditions (temperature, time period etc.) can be chosen analogously to those described in the art. The principles of prepolymerisation as described e.g. in EP 279 863, the contents of which are incorporated herein by a reference, can be used. In case a liquid monomer is used as solution for the catalyst components, the actual prepolymerisation reaction/immobilisation step can be initiated and/or controlled e.g. by the temperature. Furthermore, in general, e.g. a gaseous monomer feed may be diluted with nitrogen or other inert gas. Also a hydrogen can be used in a known manner during the prepolymerisation to control molecular weight of the prepolymer.

In another preferred embodiment, the solidification of the catalyst component(s) in the pores of the support is effected by subjecting the liquid/liquid two phase system containing the support material to an external stimulus, such as to a temperature change.

Accordingly, (i) the catalyst solution may be impregnated to the pores of the support material before or after dispersing the support to said immiscible solvent, and after the impregnation step, if needed, the impregnated support may be separated from any residual catalyst solution; and (ii) the dispersed support is subjected to a temperature change to cause the solidification of the catalyst component(s) within the pores.

Preferably, in the dispersed/suspended system, the catalyst solution used is present in the pores of the support. The temperature change is preferably effected after the impregnated support is suspended in to the immiscible solvent.

Thus the suspension system may be subjected to a rapid temperature change (e.g. within milliseconds and up to 10 seconds) to cause a fast solidification in the dispersed system or, alternatively, the system can be heated gradually (e.g. up to 24 h, preferably up to 1 h, suitably within 10-30 minutes) to cause a gradual temperature change. E.g. a change of 10 to 100° C., e.g. 30 to 80° C., may be used. The appropriate temperature change, i.e. an increase or a decrease in the temperature of an emulsion system, required for the desired solidification rate of the components cannot be limited to any specific range, but naturally depends on the emulsion system, i.a. on the used compounds and the concentrations/ratios thereof as well as the used solvents, and is chosen accordingly. It is also evident that any techniques may be used to provide sufficient heating or cooling effect to the dispersed system to cause the desired solidification.

Alternatively, the solidification may be effected during the suspending step, e.g. by dispersing the impregnated support to a heated (or cooled) solvent as continuous phase.

Furthermore the immobilising of the impregnated catalyst components may be effected by cross-linking a catalyst component, e.g. an activator, present in said solution with a cross-linking agent. E.g. the cross-linking of an aluminoxane, such as MAO, can be effected in a known manner using the principles described e.g. EP-A-685 494, the contents of which are incorporated herein by reference.

Solidification may also be effected by inducing a chemical reaction between one or more catalyst compounds in the impregnated solution. This can particularly be the case with catalysts containing Ziegler-Natta catalyst components, whereby e.g. the compounds of Group 2 and/or 4 of the periodic Table (IUPAC) may be caused to react with a precipitating agent, e.g. a halogenating and/or reducing agent, to form a catalyst component which solidifies in the pores of the carrier. An external stimulus, suitably a temperature change of the system, can also be used in case of a solidifcation by chemical reaction for inducing and/or accelerating the chemical reaction between the compounds present in the pores of the support, especially in case of Ziegler-Natta catalyst components. The methods and agents causing the solidification are within the skills of an expert in the field of Ziegler-Natta chemistry.

The "one phase" change as usable for the formation of a at least two phase system can also be utilised for solidifying the catalytically active contents within the pores of the support by, again, effecting a temperature change in the dispersed system, whereby the solvent used in the solvent of the catalyst solution present in the pores becomes miscible with the fluorous continuous phase so that the pores become impoverished of the solvent and the solidifying components remaining in the pores start to solidify. Thus the immisciblity can be adjusted with respect to the solvents and conditions (temperature) to control the solidification step.

The miscibility of fluorous solvents with organic solvents is known for a skilled person and can be chosen accordingly. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

The solid catalyst particles recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e.g. by filtration and subsequent washing of the solids with a suitable solvent.

Accordingly the formed particles may have an average size range of 1 to 500 μm, e.g. 5 to 500 μm, advantageously 5 to 200 μm, such as 10 to 100 μm, or even 5 to 50 μm all sizes of which may be usable, depending on the polymerisation the catalyst is used for, and are advantageously essentially spherical in shape.

Thus, the particle size of the catalyst particles of the invention is determined by the size of the suspended carrier particles. The initial carrier particle size may be increased, if desired, by the solidification procedure.

Polymerisation Process

The catalyst system of the invention can then be used alone or together with an additional cocatalyst(s) in the actual polymerisation step in a manner known in the art.

The olefin to be polymerised using the catalyst system of the invention can be any olefin polymerisable in a coordination polymerisation including an alpha-olefin alone or as a mixture with one or more comonomers. Preferable olefins are ethylene or propene, or a mixture of ethylene or propene with one or more alpha-olefin(s). Preferable comonomers are C2-C12-olefins, preferably C4-C10-olefins, such as 1-butene, isobutene, 1-pentene, 1-hexene, 4-methyl-1-pentene, 1-heptene, 1-octene, 1-nonene, 1-decene, as well as diene, such as butadiene, 1,7-octadiene and 1,4-hexadiene, or cyclic olefins, such as norbornene, and any mixtures thereof.

Polyethene and any copolymers thereof are particularly contemplated, as are polypropylene homopolymers and any copolymers thereof.

Furthermore, the catalyst system of the invention can be used for the polymerisation of long chain branched alpha-olefins (with 4 to 40 C atoms), alone or together with short chain branched alpha-olefins.

Polymerisation may be effected in one or more, eg one, two or three polymerisation reactors, using conventional polymerisation techniques, in particular gas phase, solution phase, slurry or bulk polymerisation. Polymerisation can be a batch or continuous polymerisation process. Generally a combination of slurry (or bulk) and at least one gas phase reactor is preferred, particularly with gas phase operation coming last.

For slurry reactors, the reaction temperature will generally be in the range of 60 to 110° C. (e.g. 85-110° C.), the reactor pressure will generally be in the range 5 to 80 bar (e.g. 50-60 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may, if desired, be effected under supercritical conditions.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or propane together with monomer (e.g. ethylene or propylene).

Generally the quantity of catalyst used will depend upon the nature of the catalyst, the reactor types and conditions and the properties desired for the polymer product. Conventional catalyst quantities, such as described in the publications referred herein, may be used.

With the method of the invention a catalyst system with a high bulk density and a good morphology is obtained and the catalyst exhibits high catalytic activity. The bulk density and morphology correlate with product bulk density and morphology—the so-called "replica effect". Thus the catalyst leads to a polymer with an advantageous high bulk density.

EXAMPLES

The following examples are provided by way of illustration of the invention. All the starting material is commercially available or can be prepared according to or analogously to the methods described in the literature.

Example 1

Preparation of Complex/MAO-Solution in a Septa Bottle (in Glove Box):

Bis(n-butylcyclopentadienyl) zirconium dichloride complex (Eurocen 5031, available from Witco) was dissolved in MAO-toluene solution (30%-wt. MAO, supplied by Albemarle) at room temperature and the mixture obtained was stirred for one hour.

The amount of complex corresponds to the desired Al/Zr ratio, the Zr-loading can be adjusted by varying the amount of the complex and/or MAO-solution in toluene.

Amounts of Catalyst Components in Examples 1 to 4:

| Example no. | Al/Zr | $w_{Zr}$ [%-wt.] | $m_{complex}$ [mg] | $V_{MAO,30\%}$ [ml] |
|---|---|---|---|---|
| Ex. 1 | 200 | 0.220 | 47.3 | 5.17 |
| Ex. 2 | 300 | 0.315 | 24 | 4 |
| Ex. 3 | 445 | 0.093 | 16.4 | 4 |
| Ex. 4 | 1200 | 0.035 | 6 | 4 |

Catalyst Preparation:

In a 200 ml glass reactor 3 ml of a complex/MAO-solution in toluene (as prepared according to one of the above examples 1 to 4) was added to a well-stirred (200 rpm) suspension of 2 g of silica carrier (SP9-391 from Grace, calcinated for 10 h at 600° C., added in glove box to the reactor) in 40 ml octadecafluorooctane (=perfluorooctane, available from Aldrich, stripped for 10 minutes with nitrogen, or 98% from P&M Invest, Moscow, Russia) at room temperature. The amount of the solution of the catalyst components corresponded to the pore volume of the silica. Stirring of the two phase mixture was continued for 10 minutes after which the complex/MAO solution had been completely sorbed by the silica, resulting in a suspension of the impregnated silica in the octadecafluorooctane.

To this suspension was then added, at room temperature, 500 mbars of ethylene. When the added ethylene was consumed (pressure decrease) more ethylene was added. Total amount of ethylene corresponded to the desired degree of prepolymerisation. Per g of polyethylene, about 3.5 bars ethylene was added in total.

To the prepolymerised particles was then added 20 ml of pentane, the mixture was stirred for one minute and then all liquid (octadecafluorooctane+pentane) was removed.

The catalyst was dried for 1 h at 50° C.

Prepolymerisation Results:

| Example no. | $m_{Silica}$ [g] | yield [g] |
|---|---|---|
| Ex. 1 | 2.0 | 3.89 |
| Ex. 2 | 2.2 | 3.85 |
| Ex. 3 | 2.15 | 3.82 |
| Ex. 4 | 2.04 | 3.65 |

Test Polymerisations:

The obtained catalyst of examples 1 to 4 were subjected to a conventional slurry polymerisation of ethylene in isobutane, 2-1 polymerization reactor

| Conditions: | |
|---|---|
| Temperature: | 80° C. |
| Slurry media: | 1200 ml isobutane (Messer Griesheim 2.5) |
| Comonomer: | 30 ml of 1-hexene (Borealis polymerisation grade), batch wise fed |
| Monomer: | 5 bars partial pressure of ethylene (Borealis polymerisation grade) |
| Catalyst amount: | 200 mg |

Polymerization Results:

| Example no. | Activity [$kg_{PE}/(h \cdot g_{Zr})$] | bulk density [kg/m$^3$] | run time [h] | Remarks |
|---|---|---|---|---|
| Ex. 1 | 955 | 388 | 1 | |
| Ex. 2 | 1130 | 403 | 1 | |
| Ex. 3 | 2070 | 410 | 1 | |
| Ex. 3 | 2660 | 470 | 3 | 3 hours run |
| Ex. 4 | 3653 | | 1 | |

As can be seen from the results the catalysts prepared according to the invention produce a polymer product with high bulk densities.

The invention claimed is:

1. A process for producing a supported olefin polymerization catalyst comprising a compound of a transition metal of Group 3 to 10 of the Periodic Table (IUPAC), comprising suspending a porous particulate support material in a liquid/liquid at least two phase system which comprises a solution of one or more catalyst components in an organic solvent selected from linear, branched or cyclic alkane or alkene, an aromatic hydrocarbon and/or a halogen containing hydrocarbon or a mixture thereof and a solvent immiscible therewith, to impregnate said solution into the pores of said support material, wherein the active transition metal concentration in the support is from 0.001 to 10% by weight of the dry catalyst system, wherein the solution impregnated in said support particles is subjected to solidification to solidify the catalyst components and wherein said immiscible solvent which forms the continuous phase comprises a fluorinated hydrocarbon, a functionalized derivative thereof, or a mixture thereof.

2. The process according to claim 1, further comprising immobilizing said catalyst component(s) of said solution present in the pores of said dispersed support particles.

3. A process for producing a supported olefin polymerization catalyst, wherein said supported olefin polymerization catalyst comprises a compound of a transition metal of Group 3 to 10 of the Periodic Table (TUPAC), comprising suspending porous support particles, wherein the pores contain a solution of one or more catalyst components, in a solvent immiscible with said solution forming a liquid/liquid at least two phase system, and solidifying said solution phase within the pores of the dispersed support, wherein said immiscible solvent which forms the continuous phase comprises a fluorinated hydrocarbon, a functionalized derivative thereof, or a mixture thereof.

4. The process according to claim 1, wherein said fluorinated hydrocarbon comprises a perfluorinated hydrocarbon.

5. The process according to claim 1, wherein said fluorinated hydrocarbon comprises a semi, highly, or perfluorinated hydrocarbon.

6. The process according to claim 1, wherein said fluorinated hydrocarbon comprises a perfluorohydrocarbon.

7. The process according to claim 1, wherein said fluorinated hydrocarbon comprises a semi fluorohydrocarbon.

8. The process according to claim 1, wherein said particles are suspended in said immiscible solvent before or after mixing of said solution therewith.

9. The process according to claim 1, wherein said particles are suspended in said solution before mixing of said solution to with said immiscible solvent.

10. The process according to claim 1, wherein the two phase mixture of the catalyst solution and the immiscible solvent is converted to a single phase liquid by adjusting the temperature, the support particles are added to the mixture and the temperature is changed to convert the one phase system into a two phase system.

11. The process according to claim 1, wherein the volume of said solution does not exceed the total pore volume of the carrier particles in said suspension.

12. The process according to claim 1, wherein the solidification of the catalyst component(s) in the pores of the support is effected by subjecting the two phase system containing the support material to a temperature change.

13. The process according to claim 12, wherein said temperature change treatment comprises subjecting the two phase system containing the support material to a gradual temperature change of up to 10° C. per minute.

14. The process according to claim 12, wherein said temperature change treatment comprises subjecting the two phase system containing the support material to a temperature change of more than 40° C. within less than 10 seconds.

15. The process according to claim 13, wherein (i) the catalyst solution is impregnated into the pores of the support material before or after dispersing the support to said immiscible solvent; and (ii) the dispersed support is subjected to a temperature change to cause the solidification of the catalyst component(s) within the pores.

16. The process according to claim 1, wherein said solidification is effected by polymerization of an olefinic monomer present in said solution.

17. The process according to claim 16, wherein the olefinic monomer is the solvent used to form said solution.

18. The process according to claim 16, wherein a gaseous olefinic monomer is added to the liquid/liquid two phase system to effect the prepolymerization of said monomer in said impregnated solution containing the catalyst particle(s).

19. The process according to claim 1, wherein the solidification is effected by cross-linking an activator with a cross-linking agent.

20. The process according to claim 1, wherein the solidification is effected by inducing within said particles a chemical reaction which yields a solid product containing said catalyst.

21. The process according to claim 1, wherein the transition metal compound is of Group 4 to 6 of the Periodic Table (TUPAC).

22. The process according to either claim 1 or claim 21, wherein the transition metal compound is a compound of formula (I):

$$(L)_m R_n MX_q \qquad (I)$$

wherein H is a transition metal as defined in claim 1 or claim 21 and each X is independently a σ-ligand, each L is independently an organic ligand which coordinates to M, R is a bridging group linking two ligands L; m is 1, 2 or 3; n is 0 or 1; q is 1, 2 or 3; and m+q is equal to the valency of the metal.

23. The process according to claim 21, wherein the transition metal compound is a metallocene.

24. The process according to claim 21, wherein the transition metal compound is a non-metallocene.

25. The process according to claim 21, wherein the transition metal compound forms a Ziegler-Natta catalyst system.

26. The process according to claim 1, wherein said catalyst further comprises an activator/cocatalyst containing aluminum or boron as said catalyst component.

27. The process according to claim 1, wherein the solid catalyst particles are recovered from said immiscible solvent and subjected to washing and drying.

28. The process for (co)polymerising an olefin in the presence of a catalyst produced according to claim 1 or claim 3.

29. A catalyst which is obtained according to the process of claim 1 or claim 3.

30. A method for the homo- or copolymerisation of olefins, the method comprising contacting a catalyst produced according to claim 1 or claim 3 with said olefins.

31. The process according to claim 2, further comprising recovering the solid catalyst particles from said immiscible solvent.

32. The process according to claim 3, wherein the active transition metal concentration in the support is from 0.001 to 10% by weight of the dry catalyst system.

33. The process according to either claim 1 or claim 3, wherein said immiscible solvent comprises a $C_3$-$C_{30}$ perfluoroalkane, -alkene, or -cycloalkane.

34. The process according to claim 33, wherein said immiscible solvent comprises a $C_4$-$C_{10}$ perfluoroalkane, -alkene, or -cycloalkane.

35. The process according to claim 34, wherein said immiscible solvent comprises a perfluorohexane, perfluoroheptane, perfluorooctane, or perfluoro(methylcyclohexane), or a mixture thereof.

36. The process according to claim 7, wherein said immiscible solvent comprises a semifluorinated n-alkane, a perfluoroalkyl-alkane, or a mixture thereof.

37. The process according to claim 13, wherein said temperature change treatment comprises subjecting the two phase system containing the support material to a gradual temperature change of up to 0.5 to 6° C. per minute.

38. The process according to claim 37, wherein said temperature change treatment comprises subjecting the two phase system containing the support material to a gradual temperature change of up to 1 to 5° C. per minute.

39. The process according to claim 13, wherein said temperature change treatment comprises subjecting the two phase system containing the support material to a temperature change of more than 50° C. within less than 6 seconds.

40. The process according to claim 15, wherein after step (i) and before step (ii) the impregnated support is separated from any residual catalyst solution.

41. A method for the homo- or copolymerization of $C_2$ to $C_{10}$ α-olefins, the method comprising contacting the catalyst produced according to claim 1 or claim 3 with said $C_2$ to $C_{10}$ α-olefins.

42. A method for the homo- or copolymerization of $C_2$ to $C_{10}$ propene or ethene olefins, or copolymers thereof, the method comprising contacting the catalyst produced according to claim 1 or claim 3 with said $C_2$ to $C_{10}$ propene or ethene olefins or copolymers thereof.

43. The process according to claim 3, wherein said fluorinated hydrocarboncomprises a semi-, highly, or perfluorinated hydrocarbon.

44. The process according to claim 3, wherein said fluorinated hydrocarbon comprises a perfluorinated hydrocarbon.

45. The process according to claim 3, wherein said immiscible solvent, which forms the continuous phase, comprises a perfluorohydrocarbon, a functionalized derivative thereof, or a mixture thereof.

46. The process according to claim 3, wherein said immiscible solvent, which forms the continuous phase, comprises a semifluorohydrocarbon, or a mixture thereof.

47. The process according to claim 3, wherein said particles are suspended in said immiscible solvent before or after mixing of said solution therewith.

48. The process according to claim 3, wherein said particles are suspended in said solution before mixing of said solution to with said immiscible solvent.

49. The process according to claim 3, wherein the mixture is made to a one phase liquid by adjusting the temperature, the support particles are added to the mixtures and the temperature is changed to break the one phase to a two phase system.

50. The process according to claim 3, wherein the volume of said solution does not exceed the total pore volume of the carrier particles in said suspension.

51. The process according to claim 3, wherein the solution impregnated in said support particles is subjected to solidification.

52. The process according to claim 51, wherein the solidification of the catalyst component(s) in the pores of the support is effected by subjecting the two phase system containing the support material to a temperature change.

53. The process according to claim 52, wherein said temperature change treatment comprises subjecting the two phase system containing the support material to a gradual temperature change of up to 10° C. per minute.

54. The process according to claim 52, wherein said temperature change treatment comprises subjecting the two phase system containing the support material to a temperature change of more than 40° C. within less than 10 seconds.

55. The process according to claim 52, wherein (i) the catalyst solution is impregnated into the pores of the support material before or after dispersing the support to said immiscible solvent; and (ii) the dispersed support is subjected to a temperature change to cause the solidification of the catalyst component(s) within the pores.

56. The process according to claim 51, wherein said solidification is effected by polymerization of an olefinic monomer present in said solution.

57. The process according to claim 56, wherein the olefinic monomer is the solvent used to form said solution.

58. The process according to claim 56, wherein a gaseous olefinic monomer is added to the liquid/liquid two phase system to effect the prepolymerization of said monomer in said impregnated solution containing the catalyst particle(s)

59. The process according to claim 51, wherein the solidification is effected by cross-linking an activator with a cross-linking agent.

60. The process according to claim 51, wherein the solidification is effected by inducing within said particles a chemical reaction which yields a solid product containing said catalyst.

61. The process according to claim 3, wherein the transition metal compound is a compound of formula (I):

$$(L)_m R_n MX_q \quad (I)$$

wherein N is a transition metal of Group 3 to 10 of the Periodic Table (TUPAC) and each X is independently a σ-ligand, each L is independently an organic ligand which coordinates to M, R is a bridging group linking two ligands L; m is 1, 2 or 3; n is 0 or 1; q is 1, 2 or 3; and m+q is equal to the valency of the metal.

62. The process according to claim 61, wherein M is a transition metal of Group 4 to 6 of the Periodic Table (IUPAC).

* * * * *